(12) United States Patent
Wei et al.

(10) Patent No.: US 8,494,499 B2
(45) Date of Patent: Jul. 23, 2013

(54) SYSTEM AND METHOD FOR ACHIEVING CALL BACK SERVICE

(75) Inventors: Xuesong Wei, Shenzhen (CN); Zhijun Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 52 days.

(21) Appl. No.: 13/203,339

(22) PCT Filed: Sep. 7, 2009

(86) PCT No.: PCT/CN2009/073779
§ 371 (c)(1),
(2), (4) Date: Aug. 25, 2011

(87) PCT Pub. No.: WO2010/099681
PCT Pub. Date: Sep. 10, 2010

(65) Prior Publication Data
US 2011/0312298 A1     Dec. 22, 2011

(30) Foreign Application Priority Data

Mar. 3, 2009  (CN) .......................... 2009 1 0105875

(51) Int. Cl.
*H04M 3/42*     (2006.01)
(52) U.S. Cl.
USPC ..... 455/414.1; 455/406; 455/407; 455/432.1; 379/114.01; 379/114.05
(58) Field of Classification Search
USPC ............. 455/404.1, 404.2, 414.1, 432.3, 433, 455/435.1, 432.1, 450, 452.1, 445, 406, 407, 455/408; 379/114.01, 114.1, 114.05, 201.02, 379/142.02; 709/227
See application file for complete search history.

(56) References Cited

U.S. PATENT DOCUMENTS

| 6,320,947 | B1 * | 11/2001 | Joyce et al. ................ 379/114.2 |
| 7,164,927 | B1 | 1/2007 | Koch et al. |

(Continued)

FOREIGN PATENT DOCUMENTS

| CN | 101111071 A | 1/2008 |
| CN | 101340641 A | 1/2009 |

(Continued)

OTHER PUBLICATIONS

English Translation of PCT International Preliminary Report on Patentability, including (1) Notification Concerning Transmittal of International Preliminary Report on Patentability and (2) Written Opinion of the International Searching Authority, for PCT/CN2009/073779, mailed Sep. 15, 2011 (6 pages).

(Continued)

*Primary Examiner* — Jean Gelin
(74) *Attorney, Agent, or Firm* — Clark & Elbing LLP

(57) ABSTRACT

The present invention relates to a system and method for achieving a Call Back service. The system includes a callback center and an online charging system (OCS) module. The method includes: the callback center receiving a callback request in which a calling party and a called party are both OCS subscribers, using a roaming number to call the calling party/called party, adjusting the charging duration of the firstly called party therein after the conversation is over, and then notifying the OCS module to deduct charges for both parties. The present invention is capable of charging reasonably and displaying the number accurately without any requirement on the cooperation of the pre-charge calling system, and the present invention is suitable to the intelligent network service which uses the OCS and the conventional intelligent network service.

8 Claims, 3 Drawing Sheets

U.S. PATENT DOCUMENTS

| | | | | |
|---|---|---|---|---|
| 8,040,862 B1 | * | 10/2011 | Rosenberg et al. | 370/338 |
| 2004/0028204 A1 | * | 2/2004 | Crook | 379/211.01 |
| 2005/0281393 A1 | | 12/2005 | Kubo et al. | |
| 2007/0099595 A1 | | 5/2007 | Koch et al. | |
| 2007/0232300 A1 | * | 10/2007 | Wolfman | 455/433 |
| 2008/0311883 A1 | * | 12/2008 | Bellora et al. | 455/406 |
| 2010/0191598 A1 | * | 7/2010 | Toennis et al. | 705/14.36 |
| 2012/0177195 A1 | * | 7/2012 | Elliott et al. | 379/240 |

FOREIGN PATENT DOCUMENTS

| | | |
|---|---|---|
| CN | 101505469 A | 8/2009 |
| EP | 1751966 B1 | 12/2007 |
| WO | WO 2005/120039 A1 | 12/2005 |

OTHER PUBLICATIONS

English Translation of PCT International Search Report for PCT/CN2009/073779, mailed Dec. 17, 2009 (4 pages).

Supplementary European Search Report for European Patent Application No. 09841014.5, dated Nov. 26, 2012 (7 pages).

* cited by examiner

SYSTEM AND METHOD FOR ACHIEVING CALL BACK SERVICE

CROSS-REFERENCE TO RELATED APPLICATIONS

This application is the U.S. National Stage filing under 35 U.S.C. §371 of International Application No. PCT/CN2009/073779, filed Sep. 7, 2009, which claims benefit of Chinese Patent Application No. 200910105875.7 filed Mar. 3, 2009.

FIELD OF THE PRESENT INVENTION

The present invention relates to the telecommunication industry field, and in particular to a system and method for achieving a Call Back service of intelligent network services.

BACKGROUND OF THE PRESENT INVENTION

An intelligent network is an architecture for generating and providing services, the most important feature of which is being capable of providing various special value-added services rapidly, conveniently, flexibly, and economically. An online charging system (OCS) achieves the separation between the service control and the charging, which is the development direction of charging in the future. Currently, there are already more and more operators using the OCS locally or entirely.

With the development of economy, the requirements of people of using international roaming calls are increasing. Since the international roaming calls relate to different countries, the international roaming communication fee will also increase gradually. Under this development trend, a technical solution for reducing the international roaming fee of the subscriber is proposed for the callback service. The so-called "callback" refers to: the subscriber in a high-charging country and area transfers a call request to the low-charging area so as to be charged according to the local relatively low fee rate, by using the market opportunity existing in the price difference of the international long distance call charging between various countries.

The conventional callback service generally contains two services: a pre-payment calling system (PPS) service and a Call Back service. The PPS service is mainly used to achieve the calling and charging of both parties, and the Call Back service is mainly used to initiate the calls to both parties and associate these two calls. The callback process generally is: the Call Back service firstly calls one party A and triggers a being-called procedure of the PSS service; after A replies, the Call Back service calls the other party B and also triggers the being-called procedure of the PPS service; after B replies, the Call Back service associates these two calls and completes the callback. However, after adopting the above callback solution, there may exist problems in three aspects as follows.

1. The conventional callback system has strong coupling and low efficiency. Generally, the Call Back service itself does not have charging function and thus needs to cooperate with other charging modules or systems (such as PPS service) to fulfill the charging of callback. As it needs the cooperation of two services to implement a callback system, the efficiency is low. Additionally, when the PPS service and the Call Back service belong to different providers respectively, correct callback charging can not be achieved, which is disadvantageous for service promotion.

2. It is unable to achieve flexible and correct charging. In the above callback solution, the being-called procedure of the PPS needs to be triggered twice; wherein in terms of the timing, the call duration of A and B is equal to the call duration of B, but the timing for A is equal to the sum of the duration of A waiting for the reply of B after the reply of A and the call duration of B, and thus the A will be overcharged by the fee which is charged for the duration of A waiting for the reply of B, which will cause the payment of A more than the charging of the real call of A.

3. There is a problem regarding the achievement of the number display of callback. In the above solution, in order to distinguish the calling and called parties of the callback, the being-called procedure of the PPS needs to add a prefix before the calling number of the callback to identify the called party or the calling party of the callback; the calling number will be re-changed in the Connect re-sent in the PPS service, so as to meet the number display requirement of the callback. Since the calling party of the callback is generally in an international roaming state, this change of the calling number to be displayed often cannot be well supported under the international roaming state.

SUMMARY OF THE PRESENT INVENTION

The technical problem to be solved by the present invention is to provide a system and method for achieving a Call Back service, and the present invention well solves the charging problem and number display problem of the callback service.

A system for achieving a Call Back service is provided according to one aspect of the present invention.

The system for achieving a Call Back service according to the present invention comprises a callback center and an online charging system (OCS) module, wherein, the callback center is configured to receive a callback request, acquire call duration and a roaming number, call a calling party and/or a called party of the callback request by using the roaming number, associate the calling party and the called party, adjust charging duration of a firstly called party, and notify the OCS module to deduct charges for the calling party/called party; and the OCS module is configured to allocate the call duration for the calling party/called party and deduct charges for the calling party/called party of the Call Back service.

Furthermore, the system for achieving the Call Back service according to the present invention further comprises a mobile switching center (MSC), wherein the MSC is configured to call the calling party and the called party, and periodically report charge reports of the calling party and the called party.

Furthermore, the callback center comprises an unstructured supplementary service (USSD) module, a callback module and a roaming number acquisition module, wherein, the USSD module is configured to receive the callback request, judge whether the called party of the callback request is an OCS subscriber, acquire location information of the one of the calling party and the called party of the callback request which is the OCS subscriber, and send the callback request and the location information to the callback module;

the callback module is configured to acquire the call duration of the calling party/called party, notify the roaming number acquisition module to acquire the roaming number of a subscriber, send to the MSC the information required by calling the calling party/called party, adjust the charging duration of the firstly called party, and notify the OCS module to deduct charges for the calling party/called party; and the roaming number acquisition module is configured to acquire the roaming number of the subscriber according to the location information of the subscriber after receiving a notification from the callback module, and send the roaming number of the subscriber to the callback module;

wherein the roaming number acquisition module and the callback module use an internal message to interact with each other; and the callback center and the OCS module use a standard Diameter credit control protocol to transfer messages there between.

A method for achieving a Call Back service is provided according to another aspect of the present invention.

The method for achieving a Call Back service according to the present invention executes the following steps when a callback center receives a callback request in which a calling party and a called party are both OCS subscribers:

Step 1: acquiring call duration and a roaming number of one party thereof, calling this firstly called party by using the roaming number, and executing Step 2 after getting a reply;

Step 2: acquiring call duration and a roaming number of the other party, calling this lastly called party by using the roaming number, and executing Step 3 after getting a reply;

Step 3: associating the firstly called party and the lastly called party, and the calling party and the called party of the callback request starting a conversation; and Step 4: adjusting charging duration of the firstly called party after the conversation is over, and notifying an OCS module to deduct charges for both parties.

After receiving the callback request, the callback center firstly judges whether the called party of the callback request is the OCS subscriber, wherein if yes, then Step 1 is executed after the callback center acquires location information of the calling party and the called party; otherwise, the following steps are executed:

Step A: acquiring the location information of the calling party;

Step B: determining the firstly called party, wherein if the firstly called party is the calling party, then it executes Step C; and if the firstly called party is the called party, then it executes Step D;

Step C: acquiring the call duration and the roaming number of the firstly called party according to the location information, calling the firstly called party by using the roaming number, calling, after getting a reply, the lastly called party by using a real number of the lastly called party, associating, after getting a reply, the firstly called party and the lastly called party, and the calling party and the called party of the callback request starting a conversation; adjusting the charging duration of the firstly called party after the conversation is over, notifying the OCS module to deduct charges for the firstly called party, and at the same time storing a charging report of the lastly called party; and Step D: calling the firstly called party by using a real number, acquiring, after getting a reply, the call duration and the roaming number of the lastly called party according to the location information, calling the lastly called party by using the roaming number, associating, after getting a reply, the firstly called party and the lastly called party, and the calling party and the called party of the callback request starting to have a conversation; adjusting the charging duration of the firstly called party after the conversation is over, storing a charging report of the firstly called party, and at the same time notifying the OCS module to deduct charges for the lastly called party.

The callback center acquires the call duration of the firstly called party/lastly called party in the following manners:

the callback center sending a request message to the OCS module to request the OCS module to return the call duration of the firstly called party/lastly called party, wherein the request message carries charging number, location information, service key value, and call type of the firstly called party/lastly called party; and the OCS module returning, after authentication is passed, the call duration of the firstly called party/lastly called party.

The callback center calls the firstly called party/lastly called party by using the roaming number in the following manners:

Step a: the callback center sending heartbeat time interval, procedure flag and the roaming number of the firstly called party/lastly called party to the MSC, wherein the heartbeat time interval is the call duration of the firstly called party/lastly called party;

Step b: the callback center establishing a connection with the MSC; and

Step c: the MSC returning a reply event of the firstly called party/lastly called party.

In the above Step 1, a calling number of the call is a real number of the lastly called party or a number configured by the callback center; and in Step 2, a calling number of the call is a real number of the firstly called party of the Call Back service or a number configured by the callback center.

During a conversation between the calling party and the called party, the MSC reports to the callback center the charging reports of the calling party and the called party which carry a procedure flag, with a period equaling to a heartbeat time interval, and the callback center requests the call duration from the OCS module for a corresponding party according to the procedure flag.

If the call duration returned by the OCS module is the last call duration of the corresponding party, then the callback center starts a timer while sending the call duration to the MSC, and the callback center actively ends the conversation when the timer expires.

The technical solution provided by the present invention is simple in structure and high in efficiency. It can charge reasonably and display numbers correctly without any requirement on the cooperation of the PPS, which is advantageous for promotion and application, therefore having relatively high practical value. The present invention can be widely used in the Call Back service of various countries and areas in the world and is suitable to be used in the intelligent network service employing the OCS and the conventional intelligent network service.

Other features and advantages of the present invention will be described hereinafter and partly become obvious from the specification, or be understood by implementing the present invention. The objects and other advantages of the present invention can be realized and obtained through the structures specified by the specification, claims and drawings.

BRIEF DESCRIPTION OF THE DRAWINGS

The drawings herein are used to provide a further understanding of the present invention and form a part of the specification, and are used to explain the present invention together with the embodiments of the present invention without unduly limiting the scope of the present invention. In the drawings.

DETAILED DESCRIPTION OF THE EMBODIMENTS

It needs to be noted that the embodiments of the present invention and the features in the embodiments can be combined with each other if there is no conflict.

The preferred embodiments of the present invention will be described in conjunction with the accompanying drawings. It shall be understood that the preferred embodiments described here are provided only for the purpose of illustration and explanation and not to limit the present invention.

A system for achieving a Call Back service is firstly provided according to an embodiment of the present invention.

Figure 1:
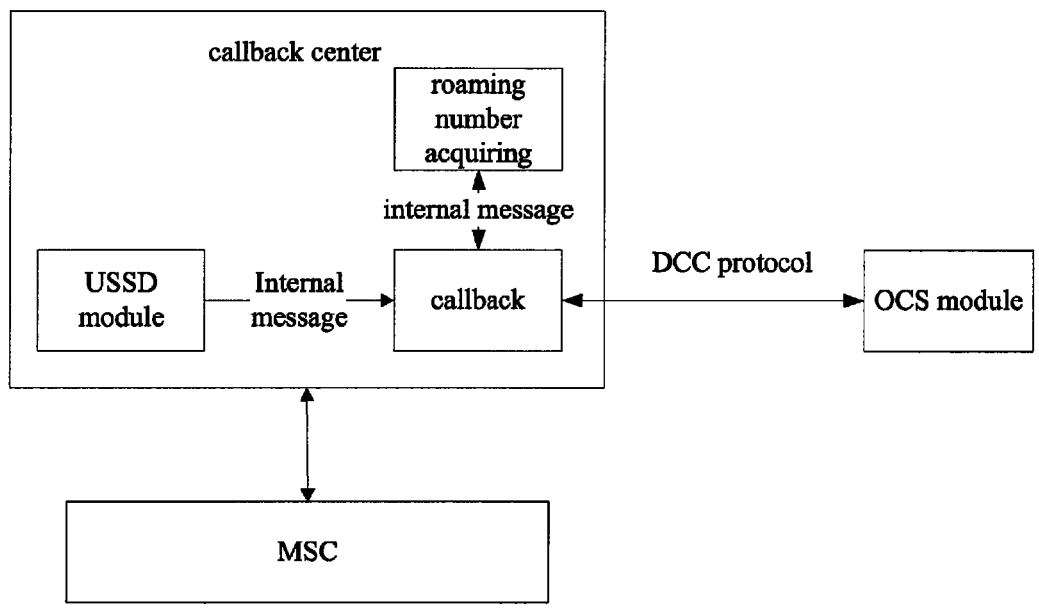
FIG. 1 is a structural block diagram of a system for achieving a Call Back service according to an embodiment of the present invention.

FIG. 1 is a structural block diagram of a system for achieving a Call Back service according to an embodiment of the present invention. As shown in FIG. 1, this system includes a callback center, a MSC and an OCS module.

The callback center is used for receiving a callback request and acquiring call duration and a roaming number; and for calling a calling party and/or a called party of the callback request by using the roaming number, associating the calling party and the called party, adjusting the charging duration of a firstly called party, and notifying the OCS module to deduct charges for the calling party/called party. The callback center includes a USSD module, a callback module and a roaming number acquisition module, wherein the USSD module is used for receiving the callback request, judging whether the called party of the callback request is an OCS subscriber and acquiring the location information of the one in the calling party and the called party of the callback request which is the OCS subscriber, and for sending the callback request and the location information to the callback module; the callback module is used for acquiring the call duration of the calling party/called party, notifying the roaming number acquisition module to acquire the roaming number of a subscriber, sending to the MSC the information required by calling the calling party/called party, adjusting the charging duration of the firstly called party, and notifying the OCS module to deduct charges for the calling party/called party; and the roaming number acquisition module is used for acquiring the roaming number of the subscriber according to the location information of the subscriber after receiving a notification from the callback module, and sending the roaming number of the subscriber to the callback module, wherein the roaming number acquisition module and the callback module use an internal message to interact with each other.

The MSC is used for calling the calling party and the called party, and for periodically reporting charging reports of the calling party and the called party.

The OCS module is used for allocating the call duration for the calling party/called party, and for deducting charges for the calling party/called party of the Call Back service. The callback center and the OCS module use a standard Diameter credit control (DCC) protocol to transfer messages there between.

A method for achieving a Call Back service is further provided according to an embodiment of the present invention.

Figure 2:
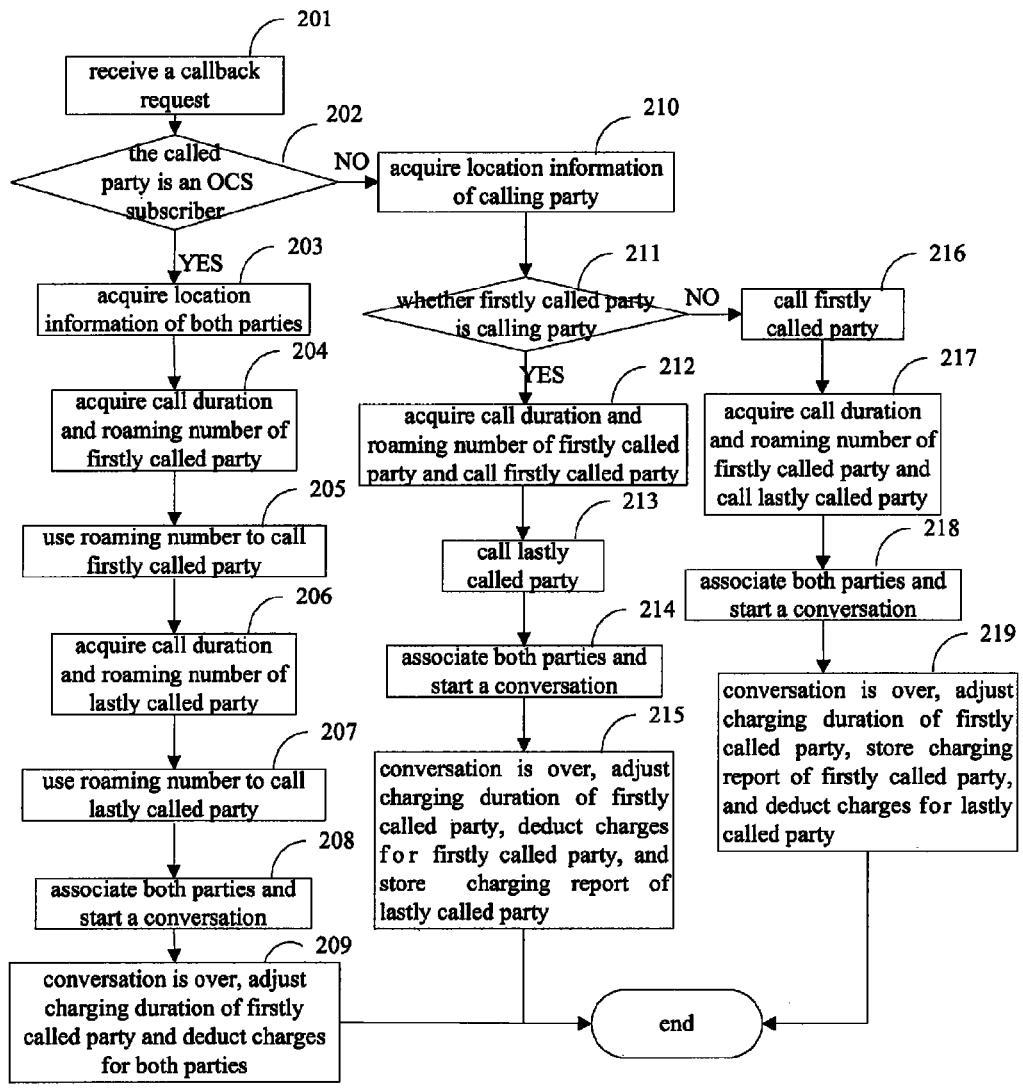
FIG. 2 is an entire flow chart of a method for achieving a Call Back service according to an embodiment of the present invention.

FIG. 2 is an entire flow chart of a method for achieving a Call Back service according to an embodiment of the present invention. As shown in FIG. 2, this method specifically comprises the steps as follows (Steps 201 to 219).

Step 201: a callback center receives a callback request.

Step 202: it is judged whether the called party of the callback request is an OCS subscriber, wherein if yes, then step 203 is executed; otherwise, step 210 is executed.

Step 203: the location information of both parties is acquired.

Step 204: one party thereof is taken as a firstly called party, and the call duration and roaming number of the firstly called party are acquired.

In the above, it is configurable in the callback center which one of the calling party and the called party is the firstly called party.

Step 205: the roaming number is used as the called number to call the firstly called party, and step 206 is executed after getting a reply.

In the above, calling by using the roaming number is to avoid the being-called procedure of the PPS.

Moreover, the calling number of this call is the real number of the lastly called party or a number configured by the callback center.

Step 206: the call duration and roaming number of the other party (the lastly called party) are acquired.

Step 207: the roaming number is used as the called number to call the lastly called party, and step 208 is executed after getting a reply.

In the above, the calling number of this call is the real number of the firstly called party or a number configured by the callback center.

Step 208: the firstly called party and the lastly called party are associated, and the calling party and the called party of the Call Back service start a conversation.

Step 209: after the conversation is over, the charging duration of the firstly called party is adjusted, then the OCS module is notified to deduct charges for the calling party and the called party of the Call Back service, and this callback procedure is over.

For example, the reply time of the firstly called party is t1, the reply time of the lastly called party is t2, and therefore the duration t2−t1 is the waiting time of the firstly called party. During the adjusting procedure, the charging time of the firstly called party is adjusted as that obtained by subtracting the waiting time from the charging duration in the charging report. In the present invention, the adjusting method can be set as required so as to achieve flexible, correct and reasonable charging of the firstly called party, which is also applicable to the following.

Step 210: the location information of the calling party is acquired.

Step 211: the firstly called party is determined, and it is judged whether the firstly called party is the calling party, wherein if yes, then Step 212 is executed; otherwise, Step 216 is executed.

Step 212: the call duration and roaming number of the firstly called party are acquired, the roaming number is used as the called number to call the firstly called party, and Step 213 is executed after getting a reply.

Step 213: the real number of the other party (the lastly called party) is used as the called number to call the lastly called party, and Step 214 is executed after getting a reply.

Step 214: the firstly called party and the lastly called party are associated, and the calling party and the called party of the callback request start a conversation.

Step 215: the charging duration of the firstly called party is adjusted after the conversation is over, the OCS module is notified to deduct charges for the firstly called party, and at the same time the charging report of the lastly called party is stored, and this callback procedure is over.

Step 216: the real number of the firstly called party is used as the called number to call the firstly called party, and step 217 is executed after getting a reply.

Step 217: the call duration and roaming number of the lastly called party are acquired, the roaming number is used as the called number to call the lastly called party, and step 218 is executed after getting a reply.

Step 218: the firstly called party and the lastly called party are associated, and the calling party and the called party of the callback request start to a conversation.

Step 219: the charging duration of the firstly called party is adjusted after the conversation is over, the charging report of the firstly called party is stored, and at the same time the OCS module is notified to deduct charges for the lastly called party, and this callback procedure is over.

Figure 3:
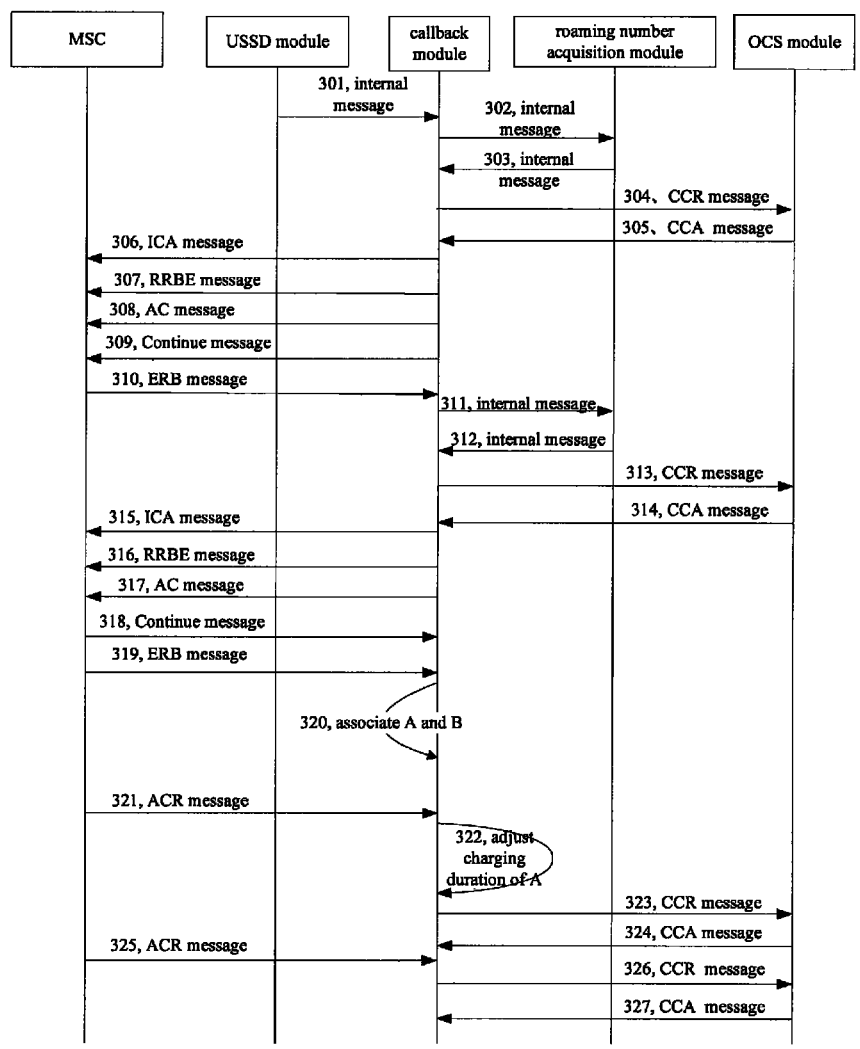
FIG. 3 is a signaling flow chart according to an embodiment of the present invention.

As shown in FIG. 3, it is a signaling flow chart according to an embodiment of the present invention. In this embodiment, it is assumed that the calling party A and called party B of the callback request are both OCS subscribers, with A being the firstly called party and B being the lastly called party. In conjunction with FIG. 1, it specifically includes the steps as follows (Steps 301 to 327).

Step 301: a USSD module sends a callback request and the location messages of A and B to a callback module via internal messages.

Step 302: the callback module notifies by means of an internal message a roaming number acquisition module to acquire the roaming number of A.

Step 303: the roaming number acquisition module returns the roaming number of A by means of an internal message.

Step 304: the callback module sends a CCR (INITIAL) to an OCS module to request the OCS to return the call duration of A.

In the CCR (INITIAL) request, the call type is of calling call, the charging number is the real number of A, the location information is the location information of A, and the service key value is Call Back service.

Step 305: the OCS module performs processing and then returns a CCA (INITIAL) to the callback module, wherein the CCA (INITIAL) carries the call duration of A.

Step 306: the callback module sends ICA to the MSC to call A, wherein the called number of ICA is the roaming number of A, the calling number is the real number of B or a number configured by the callback center; wherein if the calling number is the real number of B, then the call ID display of A displays the real number of B, and if the calling number is a configured number, then the call ID display of A displays the configured number.

Step 307: the callback module sends RRBE to the MSC and registers a being-called event.

Step 308: the callback module sends an AC to the MSC, wherein the heartbeat time interval of the AC is the call duration of A, and the procedure flag is 1 to indicate that this AC is the AC of the calling procedure.

Step 309: the callback module sends Continue to the MSC.

Step 310: the MSC, after processing, returns ERB (T_answer) to report a reply event of A.

Step 311: the callback module notifies by means of an internal message the roaming number acquisition module to acquire the roaming number of B.

Step 312: the roaming number acquisition module returns the roaming number of B by means of an internal message.

Step 313: the callback module sends a CCR (INITIAL) to the OCS module to request the OCS to return the call duration of B.

In the CCR (INITIAL) request, the call type is of called call, the charging number is the real number of B, the location information is the location information of B, and the service key value is Call Back service.

Step 314: the OCS module returns CCA (INITIAL) to the callback module after processing, wherein the CCA (INITIAL) carries the call duration of B.

Step 315: the callback module sends ICA to the MSC to call B, wherein the called number of ICA is the roaming number of B, the calling number is the real number of A or a number configured by the callback center; wherein if the calling number is the real number of A, then the call ID display of B displays the real number of A, and if the calling number is a configured number, then the call ID display of B displays the configured number.

Step 316: the callback module sends RRBE to the MSC and registers the being-called event again.

Step 317: the callback module sends an AC to the MSC, wherein the heartbeat time interval of the AC is the call duration of B, and the procedure flag is 2 to indicate that this AC is the AC of the being-called procedure.

Step 318: the callback module sends Continue to the MSC again.

Step 319: the MSC, after processing, returns ERB (T_answer) to report a reply event of B.

Step 320: the callback module associates A and B, and A and B start a conversation.

In this embodiment, it is assumed that the conversation between A and B is finished within one call duration. In other embodiments, if the conversation between A and B is not finished within one call duration, then the MSC will report, when the call duration of A/B expires, an ACR to the callback module to request a call duration, and the callback module sends, after receiving the ACR, CCR (INITIAL) to the OCS module to request the OCS module to return the call duration of A/B; and the callback module sends AC to the MSC again after the OCS module returns the call duration.

Step 321: the conversation is over, and the MSC returns an ACR to report the call report of A.

Step 322: the callback module adjusts the charging duration of A.

Step 323: the callback module sends CCR (FINAL) to the OCS module.

Step 324: after receiving the CCR (FINAL) and deducting charges for A, the OCS module returns CCA (FINAL) to the callback module.

Step 325: the MSC returns an ACR to report the call report of A.

Step 326: the callback module sends CCR (FINAL) to the OCS module.

Step 327: after receiving the CCR (FINAL) and deducting charges for B, the OCS module returns CCA (FINAL) to the callback module.

The descriptions above are only the preferable embodiments of the present invention, which are not used to restrict the present invention. For those skilled in the art, the present invention may have various changes and variations. Any amendments, equivalent substitutions, improvements, etc. within the spirit and principle of the present invention are all included in the scope of the protection of the present invention.

What is claimed is:

1. A system for achieving a Call Back service, the system comprising a callback center and an online charging system (OCS) module, wherein the callback center is configured to receive a callback request, acquire call duration and a roaming number, call a calling party and/or a called party of the callback request by using the roaming number, associate the calling party and the called party, adjust charging duration of a firstly called party, and notify the OCS module to deduct charges for the calling party/called party; and the OCS module is configured to allocate the call duration for the calling party/called party and deduct charges for the calling party/called party of the Call Back service;

the callback center comprises an unstructured supplementary service (USSD) module, a callback module and a roaming number acquisition module, wherein the USSD module is configured to receive the callback request, judge whether the called party of the callback request is an OCS subscriber, acquire location information of the one of the calling party and the called party of the callback request which is the OCS subscriber, and send the callback request and the location information to the callback module;

the callback module is configured to acquire the call duration of the calling party/called party, notify the roaming number acquisition module to acquire the roaming number of a subscriber, send to the MSC the information required by calling the calling party/called party, adjust the charging duration of the firstly called party, and notify the OCS module to deduct charges for the calling party/called party; and the roaming number acquisition module is configured to acquire the roaming number of the subscriber according to the location information of the subscriber after receiving a notification from the callback module, and send the roaming number of the subscriber to the callback module;

wherein the roaming number acquisition module and the callback module use an internal message to interact with each other; and the callback center and the OCS module use a standard Diameter credit control protocol to transfer messages there between.

2. The system for achieving the Call Back service according to claim 1, wherein the system further comprises a mobile switching center (MSC), wherein the MSC is configured to call the calling party and the called party, and periodically report charge reports of the calling party and the called party.

3. A method for achieving a Call Back service, wherein when a callback center receives a callback request in which a calling party and a called party are both online charging system (OCS) subscribers, the following steps are executed:

Step 1: acquiring call duration and a roaming number of one party thereof, calling this firstly called party by using the roaming number, and executing Step 2 after getting a reply;

Step 2: acquiring call duration and a roaming number of the other party, calling this lastly called party by using the roaming number, and executing Step 3 after getting a reply;

Step 3: associating the firstly called party and the lastly called party, and the calling party and the called party of the callback request starting a conversation; and Step 4: adjusting charging duration of the firstly called party after the conversation is over, and notifying an OCS module to deduct charges for both parties;

wherein after receiving the callback request, the callback center firstly judges whether the called party of the callback request is the OCS subscriber, wherein if yes, then Step 1 is executed after the callback center acquires location information of the calling party and the called party; otherwise, the following steps are executed:

Step A: acquiring the location information of the calling party;

Step B: determining the firstly called party, wherein if the firstly called party is the calling party, then it executes Step C; and if the firstly called party is the called party, then it executes Step D;

Step C: acquiring the call duration and the roaming number of the firstly called party according to the location information, calling the firstly called party by using the roaming number, calling, after getting a reply, the lastly called party by using a real number of the lastly called party, associating, after getting a reply, the firstly called party and the lastly called party, and the calling party and the called party of the callback request starting a conversation; adjusting the charging duration of the firstly called party after the conversation is over, notifying the OCS module to deduct charges for the firstly called party, and at the same time storing a charging report of the lastly called party; and Step D: calling the firstly called party by using a real number, acquiring, after getting a reply, the call duration and the roaming number of the lastly called party according to the location information, calling the lastly called party by using the roaming number, associating, after getting a reply, the firstly called party and the lastly called party, and the calling party and the called party of the callback request starting to have a conversation; adjusting the charging duration of the firstly called party after the conversation is over, storing a charging report of the firstly called party, and at the same time notifying the OCS module to deduct charges for the lastly called party.

4. The method for achieving the Call Back service according to claim 3, wherein the callback center acquires the call duration of the firstly called party/lastly called party in the following manners:

the callback center sending a request message to the OCS module to request the OCS module to return the call duration of the firstly called party/lastly called party, wherein the request message carries charging number, location information, service key value, and call type of the firstly called party/lastly called party; and the OCS module returning, after authentication is passed, the call duration of the firstly called party/lastly called party.

5. The method for achieving the Call Back service according to claim 4, wherein if the call duration returned by the OCS module is the last call duration of the corresponding party, then the callback center starts a timer while sending the call duration to the MSC, and the callback center actively ends the conversation when the timer expires.

6. The method for achieving the Call Back service according to claim 3, wherein the callback center calls the firstly called party/lastly called party by using the roaming number in the following manners:

Step a: the callback center sending heartbeat time interval, procedure flag and the roaming number of the firstly called party/lastly called party to the MSC, wherein the heartbeat time interval is the call duration of the firstly called party/lastly called party;

Step b: the callback center establishing a connection with the MSC; and

Step c: the MSC returning a reply event of the firstly called party/lastly called party.

7. The method for achieving the Call Back service according to claim 3, wherein in Step 1, a calling number of the call is a real number of the lastly called party or a number configured by the callback center; and in Step 2, a calling number of the call is a real number of the firstly called party of the Call Back service or a number configured by the callback center.

8. The method for achieving the Call Back service according to claim 3, wherein during a conversation between the calling party and the called party, the MSC reports to the callback center the charging reports of the calling party and the called party which carry a procedure flag, with a period equaling to a heartbeat time interval, and the callback center requests the call duration from the OCS module for a corresponding party according to the procedure flag.

* * * * *